(12) United States Patent
Jeong (10) Patent No.: US 8,266,417 B2
(45) Date of Patent: Sep. 11, 2012

(54) DEVICE HAVING SHARED MEMORY AND METHOD FOR TRANSFERRING CODE DATA

(75) Inventor: Jong-Sik Jeong, Seoul (KR)

(73) Assignee: MTekVision Co., Ltd., Seoul (KR)

( * ) Notice: Subject to any disclaimer, the term of this patent is extended or adjusted under 35 U.S.C. 154(b) by 555 days.

(21) Appl. No.: 12/375,447

(22) PCT Filed: Aug. 22, 2007

(86) PCT No.: PCT/KR2007/004009
§ 371 (c)(1),
(2), (4) Date: Jan. 28, 2009

(87) PCT Pub. No.: WO2008/032935
PCT Pub. Date: Mar. 20, 2008

(65) Prior Publication Data
US 2010/0005284 A1   Jan. 7, 2010

(30) Foreign Application Priority Data
Sep. 11, 2006 (KR) .................. 10-2006-0087284

(51) Int. Cl.
*G06F 12/00* (2006.01)
*G06F 13/00* (2006.01)
*G06F 13/28* (2006.01)
(52) U.S. Cl. ............... 713/1; 713/2; 711/147; 711/149
(58) Field of Classification Search .............. 713/1, 2; 711/147, 149
See application file for complete search history.

(56) References Cited

U.S. PATENT DOCUMENTS

| | | | |
|---|---|---|---|
| 6,912,716 B1 * | 6/2005 | Johanson et al. | 719/312 |
| 7,305,544 B2 * | 12/2007 | Bulusu et al. | 713/2 |
| 7,831,778 B2 * | 11/2010 | Cho et al. | 711/147 |
| 2002/0016891 A1 * | 2/2002 | Noel et al. | 711/153 |
| 2003/0093628 A1 * | 5/2003 | Matter et al. | 711/153 |
| 2003/0204665 A1 | 10/2003 | Jain et al. | |
| 2004/0230738 A1 | 11/2004 | Lim et al. | |
| 2005/0021914 A1 | 1/2005 | Chung | |
| 2005/0204101 A1 * | 9/2005 | Fukuzo | 711/149 |
| 2007/0136536 A1 * | 6/2007 | Byun et al. | 711/149 |
| 2007/0283137 A1 * | 12/2007 | Ueltschey et al. | 713/1 |
| 2009/0089573 A1 * | 4/2009 | Kwon et al. | 713/2 |
| 2009/0204751 A1 * | 8/2009 | Kushita | 711/104 |

FOREIGN PATENT DOCUMENTS
KR   10-0592108 B1   6/2006
* cited by examiner

*Primary Examiner* — Kim Huynh
*Assistant Examiner* — Zahid Choudhury
(74) *Attorney, Agent, or Firm* — Birch, Stewart, Kolasch & Birch, LLP (57) ABSTRACT

The present invention relates to a device having a shared memory and a code data transmitting method. According to an embodiment of the present invention, the digital processing device can include n processors, n being a natural number of 2 or greater; and a shared memory, coupled to each of the processors through independent buses and having a boot section allotted, the boot section being for writing a boot program code to be used for booting of at least one processor.

25 Claims, 6 Drawing Sheets

| Physical storage area | First bank | Second bank | Third bank | Fourth bank |
|---|---|---|---|---|
| Functional storage area | First section | First section | Common section | Second section Boot section |
| Main processor | First bank | Second bank | Third bank | – |
| Application processor | – | – | Second bank | First bank |

Figure 6

DEVICE HAVING SHARED MEMORY AND METHOD FOR TRANSFERRING CODE DATA

CROSS-REFERENCE TO RELATED APPLICATIONS

This application claims foreign priority benefits under 35 U.S.C. .sctn. 119(a)-(d) to PCT/KR2007/004009, filed Aug. 22, 2007, which is hereby incorporated by reference in its entirety.

BACKGROUND

1. Technical Field

The present invention relates to a device having a shared memory, more specifically to a digital processing device having a memory shared by a plurality of processor and a code data transmitting method.

2. Description of the Related Art

A typical digital processing device is realized to include a plurality of processors. For example, a mobile communication terminal having a camera function includes a main processor, controlling a general operation of the mobile communication terminal, and an application processor, for performing a predetermined function (e.g. the camera function). The main processor can control to start/end an operation of the application processor. It is obvious that the quantity and type of the application processor mounted on the digital processing device are varied depending on the function of the digital processing device.

Figure 1:
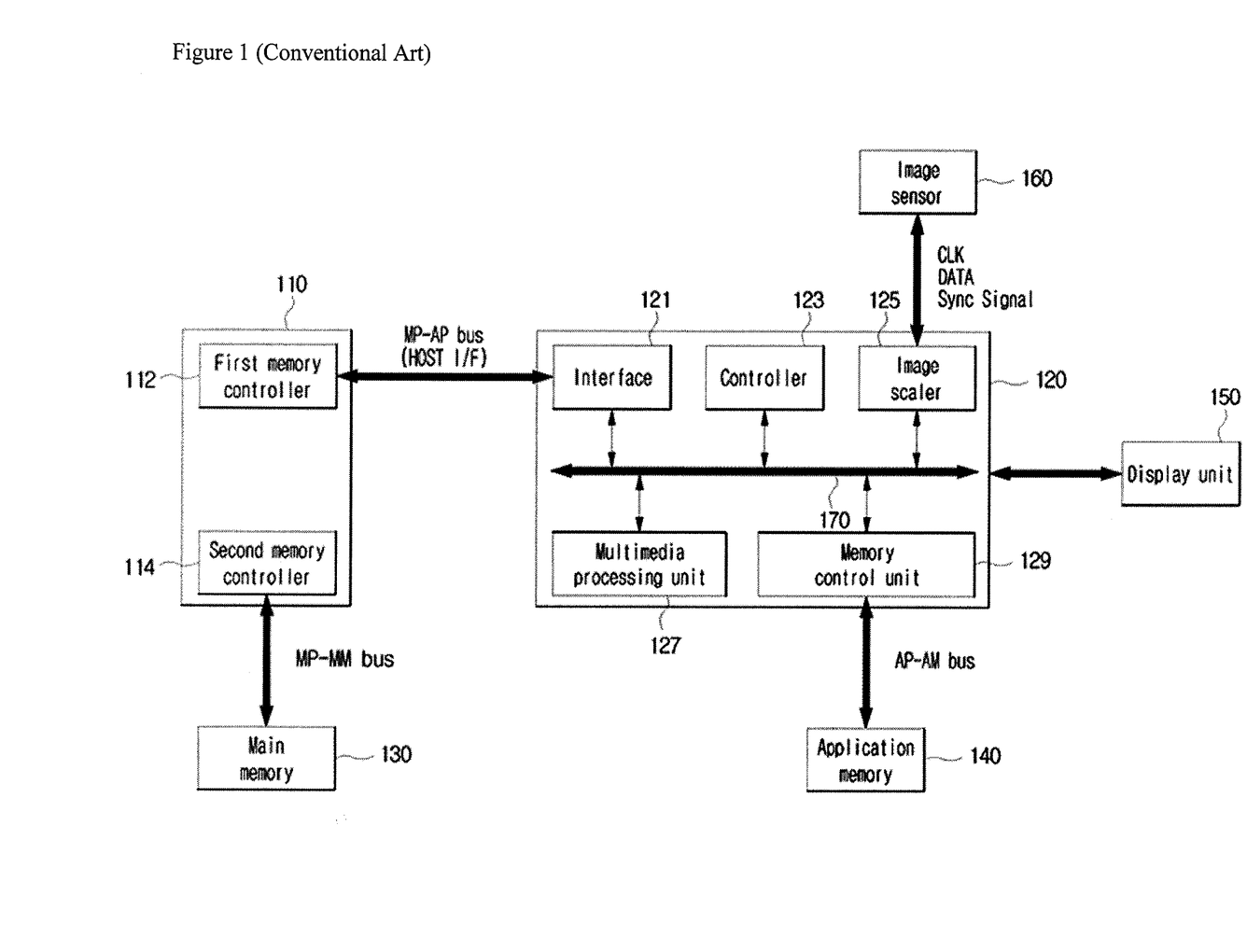
FIG. 1 is a block diagram illustrating the structure that a main processor and an application processor share an application memory, coupled to the application memory, with each other in accordance with the conventional art.

FIG. 1 is a block diagram illustrating the structure that a main processor and an application processor share a application memory, coupled to the application memory, with each other in accordance with the conventional art. The below description assumes that the application processor is a multimedia processor (i.e. a processor for controlling an image sensor 160 and performing the processing of multimedia data inputted from the image sensor 160).

Referring to FIG. 1, a main processor 110 includes a plurality of processors (e.g. a first memory controller 112 and a second memory controller 114. The main processor 110 accesses an application processor 120 through an MP (main processor)-AP (application processor) bus according to an operation of the first memory controller 112. The main processor 110, accessing the application processor 120, writes data in an application memory 140 or reads data stored in the application memory 140, by a path control of the application processor 120.

Also, the main processor 110 writes data or reads written data by accessing a main memory 130, which is directly coupled to the main processor 110 through an MP-MM (main memory) bus according to an operation of the second memory controller 114. Here, the main memory 130 is assumed to be a nonvolatile memory.

The application processor 120 includes an interface 121, a controller 123, an image scaler 125, a multimedia processing unit 127 and a memory control unit 129.

The application processor 120 is coupled to the application memory 140 having one port through an AP-AM (application memory) bus. The application processor 120 can be coupled to a display unit 150 for displaying the processed multimedia data.

The interface 121 transmits and receives data between the application processor 120 and the main processor 110. If a control signal is received from the main processor 10 through the interface 121, the application processor 120 performs a corresponding processing operation. For example, if a preview command (e.g. a command instructing to display a preview screen on the display unit 150 before capturing an external image) is received from the main processor 110, the application processor 120 processes the received preview command such that a real-time image corresponding to a real-time image signal inputted from a image sensor 160 can be displayed through the display unit 150.

The controller 123 controls an operation of the application processor 120 by using an installed program for operating the application processor 120 according to the control signal received from the main processor 110. The controller 123 can be a microcontroller unit (MCU), for example. For example, the controller 123 can control an overall operation of the application processor 120, read data necessary when executing the program from the application memory 140 and store the programming result in the application memory 140. The data necessary when executing the program, which the main processor 110 reads from the main memory 130 and provides to the application processor 120 through the MP-AP bus, can be written in the application memory 140 by the main processor 110 according to the path control of the application processor 120 or can be written in the application memory 140 by the application processor 120. The controller 123 can access the application memory 140 through a system bus 170 and the memory control unit 129 in order to read the data when executing the program.

According to the control of the controller 123, the image scaler 125 processes an image signal inputted from the image sensor 160 (or data processed by an image signal processor (ISP)) and converts the processed image signal to predetermined data. The image scaler 125 performs size control and color change of an image and soft image generation by filtering, for example. The data processed by the image scaler 125 is stored in the application memory 140 through the AP-AM bus according to path setting by the memory control unit 129.

The multimedia processing unit 127 reads image data stored in the application memory 140 to compress the image data in a predetermined format (e.g. MPEG-4 and JPEG) or give a necessary effect. Also, the multimedia processing unit 127 reads and decodes the compressed file, which is received from the main processor 110 and stored in the application memory 140, and then displays the decoded file on the display unit 150.

If internal elements of the application processor 120 require to access the application memory 140 together, the memory control unit 129 determines the priority order of the internal elements in order to allow any one of the internal elements to access the application memory 140. Also, if the main processor 110 and the application processor 120 require to access the application memory 140 together, the memory control unit 129 can control any one processor to access the application memory 140 by referring to predetermined priority order.

As such, the conventional memory has the structure that a plurality of processors or elements access one memory through one bus. Accordingly, the main processor has many time limits to use the memory of a particular application processor.

For example, in case that the main processor 110 transmits a boot program code (i.e. code data necessary for the application processor 120 to be booted), stored in the man memory 130, to the application memory 140, the main processor 110 should read the boot program code, which is stored in the main memory 130 through the MP-MM bus, and then transmit the boot program code to the application processor 120 through the MP-AP bus. Then, the application processor 120 writes the boot program code) transmitted through the main processor 10, in the application memory 140 connected to the application processor 120 through the AP-AM bus.

Accordingly, in accordance with the conventional memory sharing structure, the larger data, transferred between processors, causes many limits to use the application memory 140 connected to the application processor. This is because each internal element, included in the application processor 120, must use the AP-AM bus, connected to the application memory 140, in order to perform a processing operation.

As described above, the conventional memory sharing structure has many time delays to process high-functional and high-quality image. Also, this results in the decrease of the processing efficient of the application processor.

SUMMARY

The present invention provides a device having a shared memory and a shared memory controlling method that can transmit a program code, stored in a nonvolatile memory (i.e. a main memory), during a shortest period of time.

The present invention also provides a device having a shared memory and a shared memory controlling method that can control the shared memory such that its bank numbers, which is a physical storage area of the shared memory, can be seen in the same order by each of a main processor and an application processor.

In addition, the present invention provides a device having a shared memory and a shared memory controlling method, the shared memory including a section, having an address bank of zero (0) of a dedicated section for an application processor, which is allotted as a program code section.

Other problems that the present invention solves will become more apparent through the following description.

An aspect of the present invention features a digital processing device having a shared memory, a section of which is allotted as a boot section for storing a boot code to be used for booting of at least one processor, the shared memory being shared by a plurality of processors.

According to an embodiment of the present invention, there can be provided the digital processing device including n processors, n being a natural number of 2 or greater; and a shared memory, coupled to each of the processors through independent buses and having a boot section allotted, the boot section being for writing a boot program code to be used for booting of at least one processor.

The boot section can further stores program code data necessary when a program of the processor is operated.

The boot program code can be written by a processor for booting of one or more of other processors.

The n processors are configured to include: a main processor; and n-1 application processors, each of which is coupled to the main processor through an independent control bus and performs an operation according to a control signal inputted through the control bus.

The shared memory can further include n access ports, providing an access path for each of the processors; m dedicated sections, each of which is pre-allotted to be accessible by a predetermined processor only, m being a natural number of 2 or greater; at least one common section, independently accessible and usable by the processors during a different period of time; and an internal controller, generating access status information related to whether a processor is accessing the common section and outputting the access status information to a corresponding processor.

The boot section can be a dedicated section, pre-allotted to be accessible by corresponding processors.

A processor can write the boot program code in the common section, and another processor corresponding to the boot program code can write the written boot program code in the boot section The common section of a plurality of banks can be configured such that the processor recognizes that the common section is allotted with a number having a relatively greater value, the plurality of banks consisting of the common sections and the dedicated sections.

The internal controller can set the common section of a plurality of banks such that the processor recognizes that the common section is allotted with a number having a relatively greater value, the plurality of banks consisting of the common sections and the dedicated sections The boot section can be allotted to an address bank of zero (0).

The device can further include a nonvolatile memory, coupled to the main processor through an independent bus and storing the boot program code, whereas the main processor can read the boot program code and writes the boot program code in the common section, and the application processor corresponding the boot program code can read the boot program code and writes the boot program code in the boot section by the control of the main processor.

If the application processor completes writing the boot program code, the main processor can transmit a control command for executing the boot program code to the application processor, and the application processor can stand by in an address of zero (0) of the boot section until a next command is inputted or performs booting by using the boot program code in accordance with the control command.

The main processor can check whether the common section has an error before writing the boot program code in the common section.

The main processor may not write the boot program code in a section that has the error The main processor can write predetermined pattern data in the common section and then re-read the written pattern data for comparison with the pattern data before being written in the common section in order to check for an error.

According to another embodiment of the present invention, the digital processing device can include n processors, n being a natural number of 2 or greater; and a shared memory, coupled to each of the processors through independent buses, having a boot section and at least one common section allotted, and outputting access status information related to whether a processor is accessing a common section, the boot section being for writing a boot program code to be used for booting of one or more processors.

The shared memory can further include n access ports, providing an access path for each of the processors, n being a natural number of 2 or greater; m dedicated sections, each of which is pre-allotted to be accessible by a predetermined processor only, m being a natural number of 2 or greater; and an internal controller, generating access status information related to whether a processor is accessing the common section and outputting the generated access status information to a corresponding processor.

The access status information, inputted into a processor, can be outputted as a first status signal if another processor is accessing or attempts to access the common section and as a second status signal if another processor does not access the common section.

While the first status signal is inputted, the processor that has transmitted an access request to the shared memory can re-transmit the access request to the shared memory after the access status information is updated to the second status signal and inputted.

Each processor inputs an access request into the shared memory for access to the common section, the access request including at least one of address information and a control signal.

The control signal can include an address signal, pointing to the common section, and a chip select signal of the shared memory.

According to another embodiment of the present invention, the shared memory shared by a plurality of processors can include n access ports, providing an access path for each of the processors, n being a natural number of 2 or greater; m dedicated sections, each of which is preallotted to be accessible by a predetermined processor only, m being a natural number of 2 or greater; at least one common section, independently accessible and usable by the processor during a different period of time; a boot section, for writing a boot program code to be used for booting of at least one processor; and an internal controller, generating access status information related to whether a processor is accessing the common section and outputting the generated access status information to a corresponding processor.

The common section of a plurality of banks can be configured such that the processor recognizes that the common section is allotted with a number having a relatively greater value, the plurality of banks consisting of the common sections and the dedicated sections.

Another aspect of the present invention features a method for allowing a digital processing device to transmit code data, the digital processing device having a shared memory shared by a main processor and an application processor.

According to an embodiment of the present invention, the method for allowing a digital processing device to transmit code data, the digital processing device having a shared memory shared by a main processor and an application processor can include (a) allowing the main processor to read the boot program code from a nonvolatile memory through a first bus; (b) allowing the main processor to write the code data in a common section and to transmit a boot program code reading command to the application processor through a second bus; and (c) allowing the application processor to read the boot program code written in the common section through a third bus and to write the boot program code in a boot section.

The method can further include allowing the main processor to check whether the common section has a bad section; and storing, prior to the step (b), address information corresponding to the bad section in the nonvolatile memory if there is a bad section The boot program code reading command can include an address signal corresponding to the boot program code.

The method can further include allowing the main processor to transmit to the application processor a booting command instructing to perform the booting by using the boot program code The method can further include allowing the application processor to perform the booting by using the boot program code after completing the step (c) if the boot program code reading command includes the booting performance instruction command.

The common section of a plurality of banks can be configured such that the processor recognizes that the common section is allotted with a number having a relatively greater value, the plurality of banks consisting of the common sections and the dedicated sections.

DETAILED DESCRIPTION

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. Throughout the drawings, similar elements are given similar reference numerals. Throughout the description of the present invention, when describing a certain technology is determined to evade the point of the present invention, the pertinent detailed description will be omitted.

Terms such as "first" and "second" can be used in describing various elements, but the above elements shall not be restricted to the above terms. The above terms are used only to distinguish one element from the other.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Hereinafter, some embodiments of the present invention will be described in detail with reference to the accompanying drawings.

Figure 2:
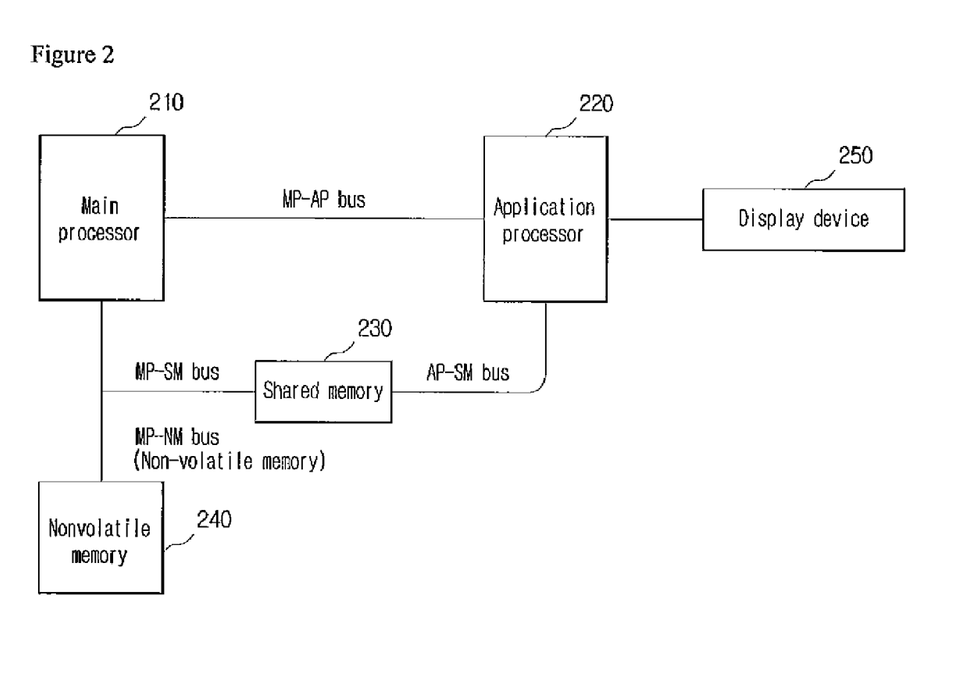
FIG. 2 illustrates the structure between a main processor, an application processor, a shared memory and a display device in accordance with an embodiment of the present invention.
Figure 3:
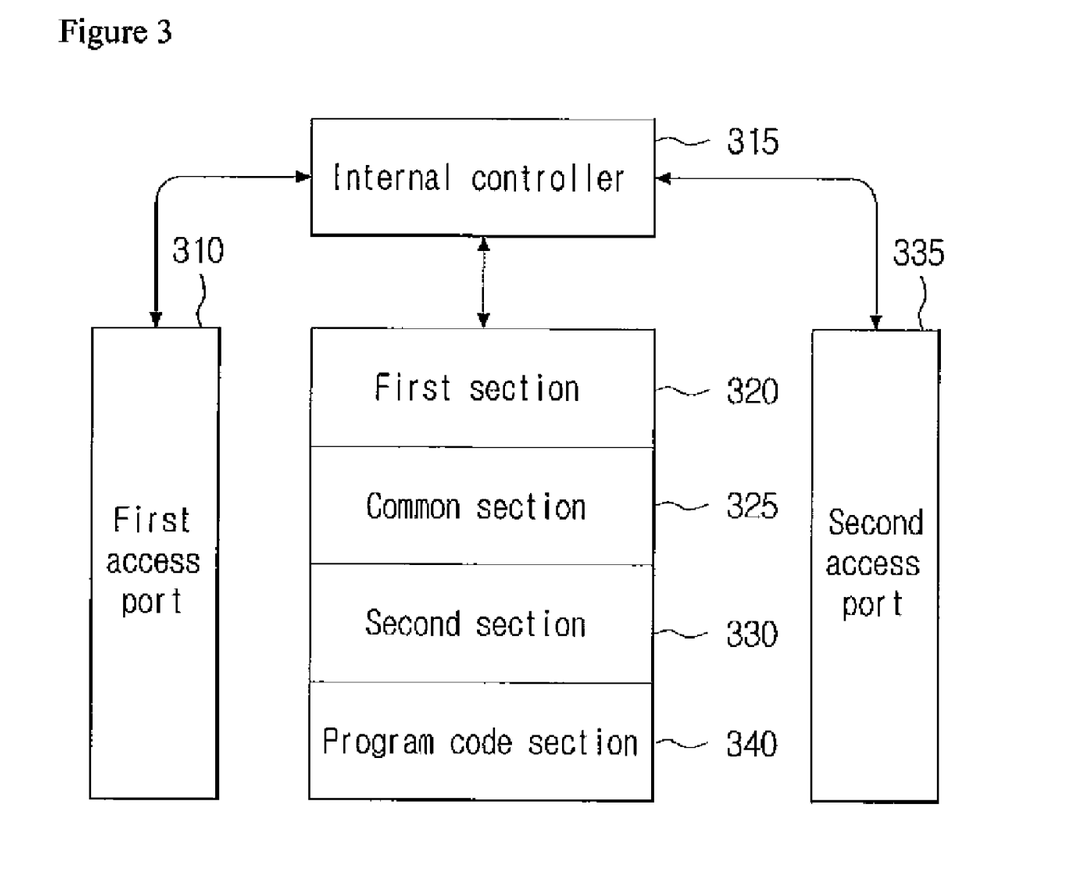
FIG. 3 and FIG. 4 illustrate the structure of a shared memory in accordance with an embodiment of the present invention.
Figure 5:
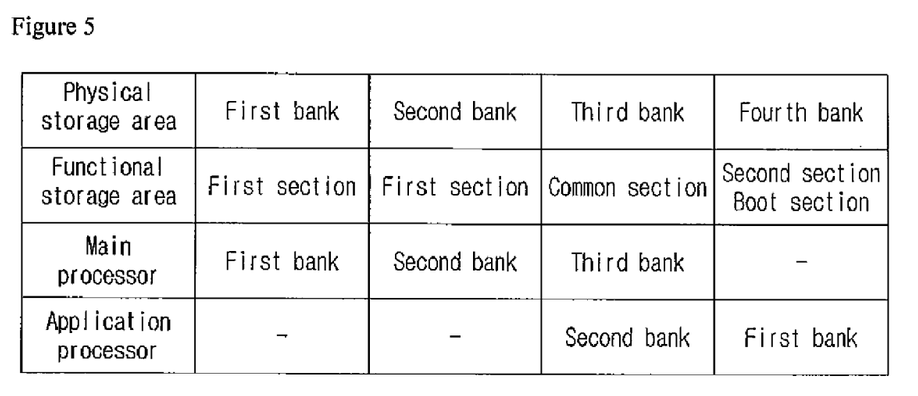
FIG. 5 illustrates a logical storage area and a physical storage area of a shared memory in accordance with an embodiment of the present invention.

FIG. 2 illustrates the structure between a main processor, an application processor, a shared memory and a display device in accordance with an embodiment of the present invention, FIG. 3 illustrate the structure of a shared memory in accordance with an embodiment of the present invention and FIG. 5 illustrates a logical storage area and a physical storage area of a shared memory in accordance with an embodiment of the present invention.

As shown in FIG. 2, in a digital processing device in accordance with the present invention, a main processor 210 and an application processor can be coupled to each other to have the structure in which one shared memory 230 is shared.

The main processor 210 is coupled to a nonvolatile memory 240 through an MP-NM bus and a shared memory 230 through an MP-SM bus. The shared memory 230 can be a nonvolatile memory.

The main processor 210, which is coupled to the application processor 220 through an NP-AP bus, can output a control command (e.g. a processing command such as an instruction for processing data stored in the shared memory 230) for controlling the application processor 220. Here, the nonvolatile memory 240 can store program codes used when executing a predetermined program of the application processor 220. The program codes can include boot program codes.

The application processor 220, which is coupled to the shared memory 230 through an AP-SM bus, writes data in a certain storage area of the shared memory 230 or reads data written in a certain storage area. For example, the application processor 220 can be a dedicated processor for processing moving picture (e.g. MPEG-4), graphic, camera and audio file (e.g. MP3) according to the control of the main processor 210).

For example, if a processing command (e.g. for instructing a processing command and a processing type for data written in an address) is received from the main processor 210 through the MP-AP bus, the application processor 220 can read data (i.e. data written by the main processor 210) stored in a pertinent storage area. Here, since the main processor 210 stores corresponding data in a common section 325 (refer to FIG. 3), the main processor 210 must firstly complete (or end) the access to the common section 325 in order that the application processor 220 can access the common section 325.

Accordingly, the application processor 220 can transmit access request information for the access to the common section 325. If the access request information is received from a processor, the shared memory 230 outputs corresponding access status information. The shared memory 230 and each processor can have pins for receiving and outputting the access status information. The number of the pins for receiving and outputting the access status information can be determined corresponding to the quantity of the common section 325. Accordingly, the main processor 210 accessing the common section 325 may recognize access request to the common section 325 from the application processor 220 by using the access status information inputted from the shared memory 230 before ending the access to the common section 325.

Before the application processor 220 can be coupled the display device 250, which is directly controlled by the main processor 210 or is controlled by the application processor 220 according to a processing command of the main processor 210. Even though FIG. 2 illustrates that the display device 250 only is coupled to the application processor 220, it is obvious that various output devices can be coupled according to the realization methods.

The shared memory 230, which is configured to be shared by a plurality of processor (e.g. the main processor 210 and the application processor 220) coupled to the shared memory 230, has access ports according to the quantity of the processors sharing the shared memory 230.

For example, if the main processor 210 and the application processor 220 are assumed to share the shared memory 230 with each other, the shared memory 230 can have two access ports (i.e. a first access port 310 and a second access port 335). Each access port can further include n pins, for transmitting and receiving an address signal with respect to a corresponding processor, m pins, for transmitting and receiving a data signal, k pins, for transmitting and receiving a control signal and p pins, for transmitting and receiving access status information to the common section of the shared memory 230 capable of being accessed in common by each processor. Here, n, m, k and p are natural numbers, respectively. Each processor can transmit the access status information for accessing the common section to the shared memory 230 in a form of an address signal or a chip selection chip.

Figure 4:
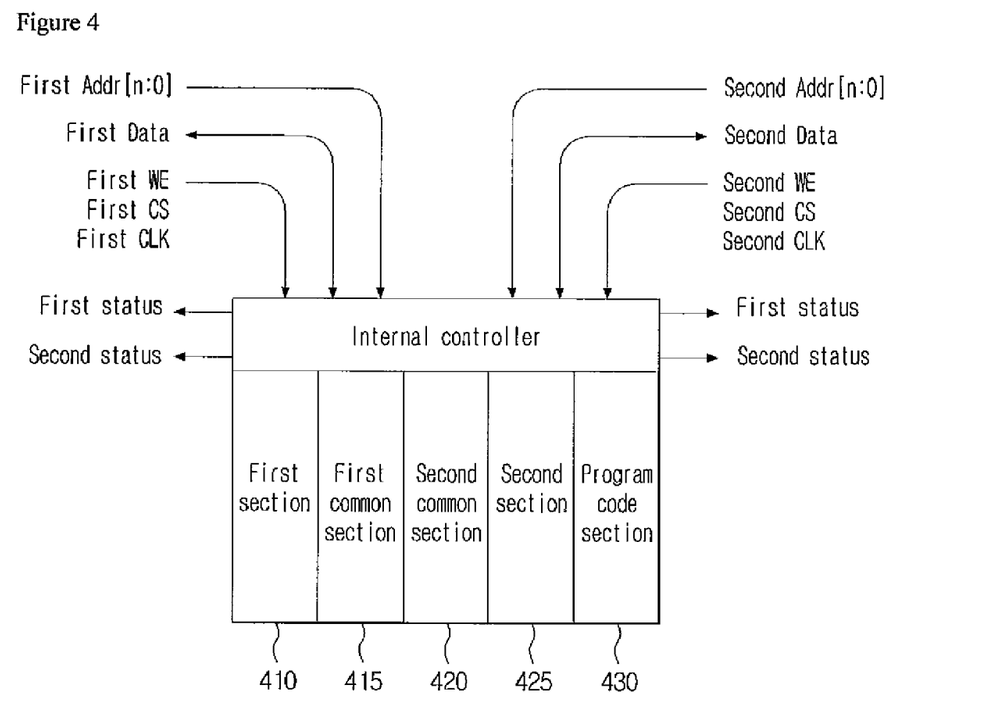

As illustrated in FIG. 3 and FIG. 4, the memory unit 230 includes an internal controller 315 and a storage area partitioned into a plurality of sections. The internal controller 315 is coupled to the main processor 210 and the application processor 220 through the first access port 310 and the second access port 335, respectively. The internal controller 315 can use the same or independent clock for each processor 210 and 220.

The shared memory 230 can be partitioned into a plurality of storage sections. The partitioned storage sections can include dedicated sections (i.e. a first section 320 and a second section 330), which are individually allotted for each of the main processor 210 and the application processor 220, at least one common section 325, which can be accessed and used by the main processor 210 and the application processor 220, respectively, during a different period of time, and a program code section 340 in which a program code necessary for operating the application processor 220 is recorded.

If data recorded in the program code section 340 is restricted to the boot data for booting the application processor 220, the program code section 340 can be referred to as a boot section.

Here, the dedicated sections (i.e. the first section 320 and the second section 330) are the sections capable of allowing only predetermined processors to exclusively access the sections through a corresponding access port. For example, the first section 320 can be restricted to allowing the main processor 210 only to access the first section 320 through the first access port 310, and the second section 330 can be restricted to allowing the application processor 220 only to access the second section 330 through the second access port 335.

The common section 325 is the section capable of being individually accessed during a different period of time. For example, if the main processor 210 is not accessing the common section 325, the application processor 220 can access the common section 325. If the main processor 210 is accessing the common section 325, the application processor 220 is unable to access the common section 325 before the main processor 210 completes the access to the common section 325. This is because since the internal controller 315 of the shared memory 230 is outputting access status information to common section 325 to each processor, each processor can recognize which processor is accessing the common section 325. For example, if a processor is accessing a particular common section, the internal controller can output access status information in a form of a high signal. This will be described later in detail with reference to FIG. 4.

The program code section 340 can be allotted to a part of the dedicated section (e.g. the second section 330) determined corresponding to the application processor 220. Of course, the program code section 340 for the main processor 210 can be additionally allotted to a part of the dedicated section (e.g. the first section 320). However, since the main processor 210 reads a program code from the nonvolatile memory 240, directly coupled to the main processor 210, the allotment of the corresponding program code section may be unnecessary. Of course, when the main processor 210 reads the program code every desired time, if using the shared memory 230 has the more efficient operation speed than using the nonvolatile memory 240, the program code section may be additionally allotted.

For example, if the shared memory 230 is a SDRAM, the shared memory 230 can have the internal structure in which the storage area is partitioned in units of banks. Of course, it is natural that each partitioned sections can be allotted according to a predetermined partitioning standard (e.g. address range). However, it is one of good examples to allot each partitioned section in units of banks. If the shared memory 230 is a 256 M bit SDRAM, the storage area can be partitioned in 8 M bytes×8 bits×4 banks. Each of the 4 banks can be allotted as the first section 320, the common section 325, the second section 330 and the program code section 340.

Referring to FIG. 5, it is possible that the bank number of the shared memory 230 recognized by the main processor 210 can be recognized as being the same as that of the actual shared memory 230.

Since the bank number of the shared memory 230 recognized by the application processor 220 is larger than the bank number of the common section 325, in the case of the application processor 220, the program code section 340 is allotted to the common section 325. However, since the program code section 340 is the storage area in which the program code (e.g. a boot program code) is written, the program code section 340 must be always in the shared memory 230 due to the property of the boot program code. Accordingly, if the shared memory 230 is viewed from the application processor 220, the bank number must be controlled to be seen in a reverse order. This is because the address bank of zero (0) is generally used as a reset address.

In other words, since the bank number of the common section 325 goes before the bank number of the actual shared memory 230, the address bank of zero (0) should be used as the common section 325. However, the common section 325 is not adequate to be used as the reset address, which is the space for storing temporary data. Also, the program code area 340 must include the address bank of zero (0) due to the property of the boot program code. Accordingly, the shared memory 230 should be controlled in order that the bank number can be recognized in a reverse order and processed for the application processor 220.

For example, the application processor 220 can recognize the bank number in the reverse order by analyzing the bank signal, inputted from the internal controller 315 of the shared memory 230, in the reverse order. Accordingly, if the main processor 210 is assumed to access a plurality of partitioned sections in a forwarding order, it can be recognized that the application processor 220 accesses the corresponding partitioned sections in the reverse order. Thus, the application processor 220 can be controlled to use the address bank of zero (0) for the program code section 340.

FIG. 4 illustrates the structure of a shared memory in accordance with another embodiment of the present invention. Hereinafter, the method of allowing the shared memory 230 to provide access status information will be described with reference to FIG. 4. The below description assumes that the main processor 210 writes a boot program code, which is one of program codes, in the first common section 415 in order to transmit the boot program code to the application processor 220. Also, as illustrated in FIG. 4, the access status information (i.e. a first status and a second status) that the shared memory 230 outputs to each processor shows the statuses of the first common section 415 and the second common section 420, respectively. Here, the first status is assumed to refer to the access status information to the first common section 415 and the second status is assumed to refer to the access status information to the second common section 420 in the below description.

If the main processor 210 is accessing the first common section 415, the first status, outputted to the application 220, has a high status (which is assumed to show the status in which a processor is accessing to the first common section 415 or in which a processor has required the access to the first common section 415). Also, if the application processor 220 has required the access to the first common section 415 in one of the foregoing statuses, the first status, outputted to the main processor 210, is converted to the high status (which is assumed to show the status in which a processor is accessing to the first common section 415 or in which a processor has required the access to the first common section 415).In other words, the access status information, outputted to the main processor 210, can be set to indicate the status in which the application processor 220 is accessing each common section or whether the application processor 220 has required the access to each common section. The access status information, outputted to the application processor 210, can be set to indicate the status in which the main processor 210 is accessing each common section or whether the main processor 210 has required the access to each common section.

The main processor 210 transmits access request to the first common section 415 to the shared memory 230 through the first access port 310 in order to access the first common section 415 of the shared memory 230 to write a boot program code. Before accessing the first common section 415, the main processor 210 can pre-recognize whether the application processor 220 is accessing, has required the access to or is not accessing the first common section 415, by referring to the access status information outputted from the shared memory 230.

Here, the access request can be performed by writing a predetermined value in a section of the internal controller 315 or the storage area, transmitting an address signal to the internal controller 315 or transmitting an address signal and a control signal together. The address signal can be certain address information (i.e. a first Addr) of the first common section 415 for writing data. Also, the control signal can be at least one of a first write enable (WE) for instructing to write data in the first common section 415, a first chip select (CS) for the first common section 415, and a first clock (CLK).

The internal controller 315 can recognize that the main processor 210 attempts to access the first common section 415 through the access request.

If the access request is a predetermined value written in the predetermined register, the internal controller 315 can recognize whether to attempt to access the pertinent common section by checking whether the corresponding value is written in the corresponding register. The register can be predetermined for each processor. For example, if the register is predetermined for each processor, the corresponding processor can write first information (e.g. '1') in the register to attempt the access and write second information (e.g. '0') in the register after ending the access.

If the access request is the address signal, the internal controller 315 can recognize that the main processor 210 attempts to access the first common section 415 by using the inputted address signal. Also, in case that the access request consists of the address signal and the control signal, the internal controller 315 can recognize that the main processor 210 attempts to access the first common section 415 by the same way. However, if the access request further includes the control signal, the internal controller 315 can additionally recognize what operation the main processor 210 attempts to perform through the access to the first common section 415.

If recognizing that the main processor 210 attempts to access the first common section 415 by using the inputted access request, the shared memory 230 can change the access status information outputted to the application processor 220 so as to correspond to the recognition.

If recognizing that the application processor 220 has not yet accessed the first common section 415 by referring to the access status information to the common section 415 inputted from the shared memory 230, the main processor 210 can access the first common section 415. Alternatively, if the application processor 220 has not yet accessed the first common section 415, the internal controller 315 can control the main processor 210 to access the first common section 315. In this case, the shared memory 230 can transform the access status information of the high state into a signal of the high state from a point of time when the main processor 210 requites to access the first common section 415 or when the main processor 210 starts to access the first common section 415, to output the signal of the high state to the application processor 220. Through this, the application processor 220 can recognize that the main processor 210 is requiring to access or is stopping accessing the first common section 415.

Similarly, the foresaid method can be applied to each common section in the cases of being partitioned the common section into one common section or two or more common sections, respectively. Also, the same method can be applied to the case that the application processor 220 is attempting to access a common section. Accordingly, the pertinent description related to each case will be omitted.

Figure 6:
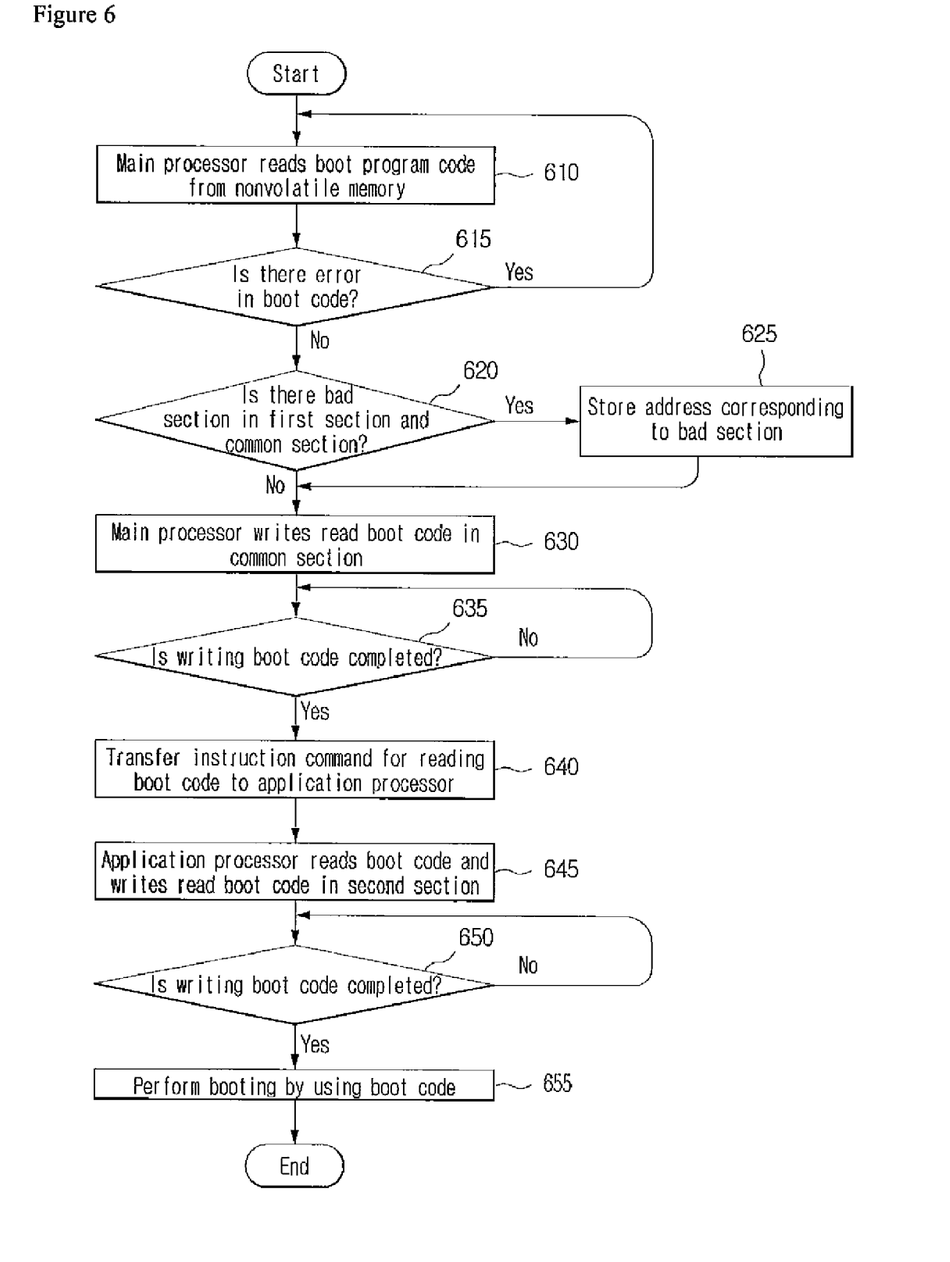
FIG. 6 is a flow chart illustrating the method that a main processor transfers a boot program code to an additional processor in accordance with an embodiment of the present invention.

FIG. 6 is a flow chart illustrating the method that a main processor transfers a boot program code to an additional processor in accordance with an embodiment of the present invention. The below description assumes that the main processor 210 provides a boot program code necessary for booting of the application processor 220 and an address bank of zero (0), recognized by the application processor 220, is allotted to the program code section 340. For this, the application processor 220 can be controlled so as to be coupled to the shared memory 230 reversely in an accessing direction of the main processor 210. Alternatively, the internal controller 315 can control the application processor 220 to access each section of the shared memory 230 reversely in an accessing direction of the main processor 210.

In a step represented by 610, the main processor 210 reads a boot program code form the nonvolatile memory 240. In a step represented by 615, the main processor 210 determines whether the read boot program code includes an error code. The main processor 210 can determine whether the boot program code includes an error code by checking parity, for example.

If it is determined that there is an error, the main processor 210 returns to the step represented by 610 and re-read a boot program code from the nonvolatile memory 240.

However, if it is determined that there is no error, in a step represented by 620, the main processor 210 checks whether the common section 325 includes a bad section in order to write the read boot program code in the common section 325. Also, the main processor 210 can further check whether the first section 320, allotted as the dedicated section, has a bad section.

For example, the main processor 210 can check whether to include a bad section through writing or/and reading with respect to a section (i.e. the first section 320 or the common section 325) by using at least one of a predetermined control signal, address signal and data signal.

In other words, the main processor 210 can write predetermined data (e.g. data corresponding to a certain pattern) in the first section 320 or the common section 325 corresponding to the address signal and then read previously written data from the pertinent address and compare the written data with the previously written data (e.g. diagonostic checking and write verify checking) in order to determine whether there is a bad section.

If there is a bad section, in a step represented by 625, the main processor 210 stores the address information of the section, determined as the bad section, in the nonvolatile memory 240.

However, if there is no bad section or writing the address information of a section determined as the bad section is completed, in a step represented by 630, the main processor 210 writes the read boot program code in the common section 325 by using the MP-SM bus and the first access port 310. Of course, when writing the boot program code, if the address information related to the bad section is written, the boot program code is not written in the position corresponding to the address information related to the bad section. Here, the main processor 210 receives the access status information to the common section 325 from the shared memory 230. If it is possible to use the common section 325, the main processor 210 can write the boot program code.

For example, the main processor 210 can update a resister (not shown), which is set to be updated corresponding to the access status of the common section 325 in the internal controller 315 of the shared memory 230, as first information (e.g. '1'). Through this, the shared memory 230 outputs the access status information of the high state to the application processor 220 to inform that the shared memory 230 is being used by another processor in order to prevent the application processor 220 from accessing the common section 325. However, if the common section 325 is partitioned into a plurality of subsections, the application processor 220 can access the subsection that is not being accessed by another processor to write the boot program code.

In a step represented by 635, the main processor 210 determines whether writing the boot program code in the common section 325 is completed.

For example, the main processor 210, which knows the whole size of the boot program code, can know the last address of the boot program code to be written. Accordingly, if writing the last address is completed, the main processor 210 can determine that all boot program codes are written. Also, while writing the boot program code, the main processor 210 can check whether the data written in a cell is identical to the data read for writing in real time.

If writing the boot program code is not completed, the main processor 210 standbys in the step represented by 635.

However, if it is determined that writing the boot program code is completed, in a step represented by 640, the main processor 210 outputs a control command instructing to read the boot program code (hereinafter, referred to as "a boot program code reading command") to the application processor 220 through the MP-AP bus. The main processor 210 will end the access to the common section 325 before outputting the corresponding control command, and the shared memory 230 will output the updated access status information to the application processor 220.

Here, the boot program code reading command can include the address information of the boot program code stored in the common section 325.

In a step represented by 645, the application processor 220 reads the boot program code from the common section 325 by the boot program code reading command and writes the read boot program code in a dedicated section (i.e. the second section 330). As described above, the application processor 220, which accesses the physical storage area of the shared memory reversely, can write the read boot program code in an address bank of zero (0) (i.e. the program code section 340) corresponding to the second section 330.

Also, the application processor 220 can write the boot program code in the second section 330 and then re-read the written boot program code to check whether the written boot program code is identical to the previously written boot program code in order to check the stability of the second section 330.

In a step represented by 650, the application processor 220 determines whether writing the boot program code is completed.

For example, since the application processor 220 knows the whole size of the boot program code by receiving information related to the whole size of the boot program code from the main processor 210, the application processor 220 can determine whether all boot program codes is written by comparing the size of the written boot program code with the whole size information.

If writing the boot program code is not completed, the application processor 220 standbys in the step represented by 650.

However, if writing the boot program code is completed, in a step represented by 655, the application processor 220 performs the booting by using the boot program code. For example, the boot program code reading command, inputted from the main processor 210, can include a control command instructing to perform the booting by using the pertinent boot program code after competing writing the boot program code (hereinafter, referred to as "a booting performance instruction command").

Of course, according the realizing method, if the application processor 220 transfers to the main processor 210 a predetermined control command informing that writing the boot program code is completed, after completing writing the boot program code, the main processor 210 can be realized to transfer the control signal for instructing to perform the booting by using the boot program code (i.e. the booting performance instruction command).

The present invention can transmit a program code, stored in a nonvolatile memory (i.e. a main memory), during a shortest period of time by providing a device having a shared memory and a shared memory controlling method.

The present invention can also control the shared memory such that its bank numbers, which is a physical storage area of the shared memory, can be seen in the same order by each of a main processor and an application processor.

In addition, the present invention can allot a zero bank address of a dedicated section for an application as a boot section.

Hitherto, although some embodiments of the present invention have been shown and described for the above-described objects, it will be appreciated by any person of ordinary skill in the art that a large number of modifications, permutations and additions are possible within the principles and spirit of the invention, the scope of which shall be defined by the appended claims and their equivalents.

What is claimed is:

1. A digital processing device, comprising:
n processors, n being a natural number of 2 or greater, the n processors including a main processor, and n-1 application processors, wherein each of the n-1 application processors is coupled to the main processor through an independent control bus and performs an operation according to a control signal inputted through the control bus from the main processor; and
a shared memory, coupled to each of the n processors through independent buses and having a boot section allotted, the boot section being for writing a boot program code to be used for booting of at least one processor,
wherein the shared memory further comprises:
n access ports, providing an access path for each of the n processors;
m dedicated sections, each of which is pre-allotted to be accessible by a predetermined processor only, m being a natural number of 2 or greater;
at least one common section, independently accessible and usable by the n processors during a different period of time; and
an internal controller, generating access status information related to whether a processor of the n processors is accessing the common section and outputting the access status information to a corresponding processor, and
wherein a processor writes the boot program code in the common section, and then another processor corresponding to the boot program code reads the boot program code from the commons section and then writes the written boot program code in the boot section.

2. The device of claim 1, wherein the boot section further stores program code data necessary when a program of one of the n processors is operated.

3. The device of claim 1, wherein the boot program code is written by a processor for booting of one or more of other processors.

4. The device of claim 1, wherein the boot section is a dedicated section, pre-allotted to be accessible by corresponding processors.

5. The device of claim 1, wherein the common section of a plurality of banks is configured such that the n processors recognize that the common section is allotted with a number having a relatively greater value, and the plurality of banks includes the common section and the dedicated sections.

6. The device of claim 1, wherein the internal controller sets the common section of a plurality of banks such that the n processors recognize that the common section is allotted with a number having a relatively greater value, and the plurality of banks includes the common section and the dedicated sections.

7. The device of claim 1, wherein the boot section is allotted to an address bank of zero (0).

8. The device of claim 1, further comprising a nonvolatile memory, coupled to the main processor through an independent bus and storing the boot program code,
wherein the main processor is the processor, and reads the boot program code and writes the boot program code in the common section, and an application processor among the n-1 application processors corresponding the boot program code is the another processor, and reads the boot program code and writes the boot program code in the boot section by the control of the main processor.

9. The device of claim 1, wherein, if an application processor among the n-1 application processors completes writing the boot program code, the main processor transmits a control command for executing the boot program code to the application processor, and the application processor stands by in an address of zero (0) of the boot section until a next command is inputted or performs booting by using the boot program code in accordance with the control command.

10. The device of claim 1, wherein the main processor checks whether the common section has an error before writing the boot program code in the common section.

11. The device of claim 10, wherein the main processor does not write the boot program code in a section that has the error.

12. The device of claim 10, wherein the main processor writes predetermined pattern data in the common section and then re-reads the written pattern data for comparison with the pattern data before being written in the common section in order to check for an error.

13. A digital processing device, comprising:
n processors, n being a natural number of 2 or greater, the n processors including a main processor, and n-1 application processors, wherein each of the n-1 application processors is coupled to the main processor through an independent control bus and performs an operation according to a control signal inputted through the control bus from the main processor; and
a shared memory, coupled to each of the n processors through independent buses, having a boot section and at least one common section allotted, and outputting access status information related to whether a processor is accessing a common section, the boot section being for writing a boot program code to be used for booting of the n processors,
wherein the shared memory further comprises:
n access ports, providing an access path for each of the n processors,
m dedicated sections, each of which is pre-allotted to be accessible by a predetermined processor only, m being a natural number of 2 or greater; and
an internal controller, generating access status information related to whether a processor among the n processors is accessing the common section and outputting the generated access status information to a corresponding processor,
wherein the main processor writes the boot program code in the common section, and then one of the n-1 application processors corresponding to the boot program code reads the boot program code from the commons section and then writes the written boot program code in the boot section.

14. The device of claim 13, wherein the access status information, inputted into a processor, is outputted as a first status signal if another processor is accessing or attempts to access the common section and as a second status signal if the another processor does not access the common section.

15. The device of claim 13, wherein, while the first status signal is inputted, the processor that has transmitted an access request to the shared memory retransmits the access request to the shared memory after the access status information is updated to the second status signal and inputted.

16. The device of claim 13, wherein each processor inputs an access request into the shared memory for access to the common section, the access request including at least one of address information and a control signal.

17. The device of claim 16, wherein the control signal comprises an address signal, pointing to the common section, and a chip select signal of the shared memory.

18. A shared memory shared by a plurality of processors, the memory comprising:
n access ports, providing an access path for each of the plurality of processors, n being a natural number of 2 or greater;
m dedicated sections, each of which is pre-allotted to be accessible by a predetermined processor only, m being a natural number of 2 or greater;
at least one common section, independently accessible and usable by the plurality of processors during a different period of time;
a boot section, for writing a boot program code to be used for booting of at least one processor; and
an internal controller, generating access status information related to whether a processor is accessing the common section and outputting the generated access status information to a corresponding processor,
wherein the plurality of processors includes a main processor, and n-1 application processors, and each of the n-1 application processors is coupled to the main processor through an independent control bus and performs an operation according to a control signal inputted through the control bus from the main processor, and
wherein the main processor writes the boot program code in the common section, and then one of the n-1 application processors corresponding to the boot program code reads the boot program code from the common section and then writes the written boot program code in the boot section.

19. The memory of claim 18, wherein the common section of a plurality of banks is configured such that the n processors recognize that the common section is allotted with a number having a relatively greater value, the plurality of banks consisting of the common section and the dedicated sections.

20. A method for allowing a digital processing device to transmit a boot program code, the digital processing device having a shared memory shared by a main processor and an application processor, the method comprising:
(a) allowing the main processor to read the boot program code from a nonvolatile memory through a first bus;
(b) allowing the main processor to write the boot program code in a common section and to transmit a boot program code reading command to the application processor through a second bus; and
(c) allowing the application processor to read the boot program code written in the common section through a third bus and to write the boot program code in a boot section,
wherein the application processor is coupled to the main processor through an independent control bus and performs an operation according to a control signal inputted through the control bus from the main processor.

21. The method of claim 20, further comprising:
allowing the main processor to check whether the common section has a bad section; and
storing, prior to the step (b), address information corresponding to the bad section in the nonvolatile memory if there is a bad section.

22. The method of claim 20, wherein the boot program code reading command comprises an address signal corresponding to the boot program code.

23. The method of claim 20, further comprising allowing the main processor to transmit to the application processor a booting command instructing to perform the booting by using the boot program code.

24. The method of claim 20, further comprising allowing the application processor to perform the booting by using the boot program code after completing the step (c) if the boot program code reading command includes the booting performance instruction command.

25. The method of claim 20, wherein the common section of a plurality of banks is configured such that the main processor and the application processor recognize that the common section is allotted with a number having a relatively greater value, the plurality of banks consisting of the common section and the dedicated sections.

* * * * *